Figure 1:
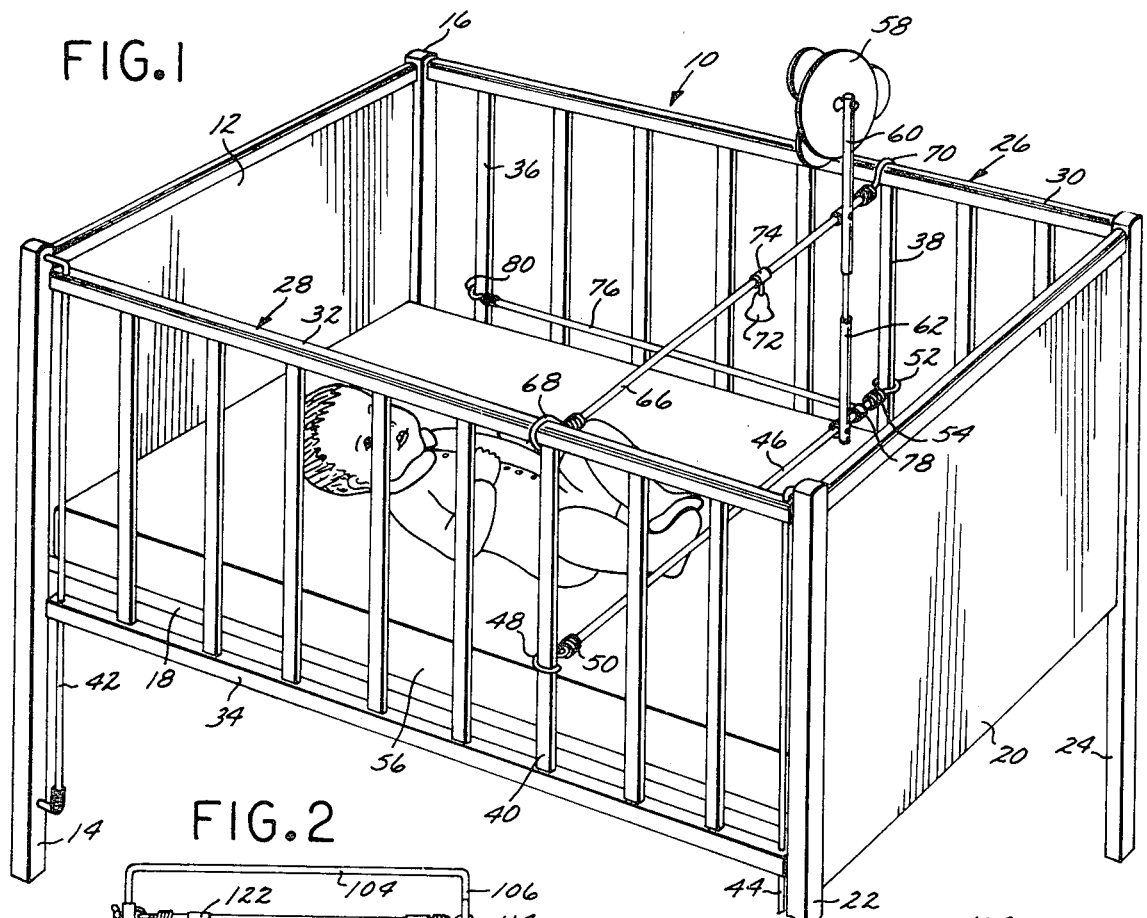

United States Patent

Carreno

[15] 3,638,602
[45] Feb. 1, 1972

[54] EDUCATIONAL TOY

[72] Inventor: Fernando Carreno, 10225 Traylor Way, Garden Grove, Calif. 92641

[22] Filed: Apr. 14, 1969

[21] Appl. No.: 815,964

[52] U.S. Cl. ........................... 116/114, 5/93, 46/124, 116/67, 272/61
[51] Int. Cl. ............................................ G01d 21/00
[58] Field of Search ........................... 116/67, 114; 5/93–100, 317; 46/32, 124, 175, 1

[56] References Cited

UNITED STATES PATENTS

| D147,776 | 11/1947 | Blackelman | D34/15 |
|---|---|---|---|
| 462,178 | 10/1891 | Thomas | 5/317 X |
| 2,214,882 | 9/1940 | Eades | 5/317 X |
| 2,303,223 | 11/1942 | Murray et al. | 46/175 |
| 2,327,253 | 8/1943 | Eisel | 272/61 |
| 2,994,156 | 8/1961 | Steiner et al. | 46/124 |
| 3,014,307 | 12/1961 | Dupuis | 46/1 |

FOREIGN PATENTS OR APPLICATIONS

| 22,405 | 1905 | Great Britain | 46/32 |
|---|---|---|---|
| 670,881 | 4/1952 | Great Britain | 46/32 |

*Primary Examiner*—Louis J. Capozi
*Attorney*—Nienow & Frater

[57] ABSTRACT

This invention relates to educational toys for attachment to infants' cribs. In one embodiment which is explained in detail in the specification, the toy includes a resilient line terminating in hooks by which it is extended taut across the crib in a position and at a level for engagement by the feet of an infant occupying the crib. It includes a second elastic line connected at one end to a point along the length of the first and having a hook at its other end by which it can be connected to the side of the crib and there held taut in a position and at a level for engagement by an arm of an infant occupying the crib. The toy also includes a bell and brightly colored discs and connected to and carried by the elastic lines so that the bell is rung and the discs are moved when the elastic lines are moved as an incident to engagement by the infant's limbs.

Another embodiment includes a frame connected to the crib so that it extends upright above the crib wall. An arm of the frame extends over the crib and carries a mobile which is actuated by a cord interconnecting the mobile with an elastic cord which is stretched across the crib in position for engagement by one of the infant's limbs.

8 Claims, 3 Drawing Figures

PATENTED FEB 1 1972

3,638,602

INVENTOR.
FERNANDO CARRENO
BY Nienow & Frater
ATTORNEYS

EDUCATIONAL TOY

This invention relates to improvements in educational toys and it relates particularly to educational toys for infants.

It has been suggested that the ability of children to learn and the intelligence quotient that they can ultimately achieve is materially enhanced if the instruction of the child begins while still a very small infant. Certain research efforts in the area of child instruction are said to demonstrate, or at least to suggest strongly, that a child's learning ability can be greatly enhanced by increasing his awareness of his surroundings and of the effect of his actions even prior to his beginning to crawl and while he is confined to a crib. An object of the invention is to create a structure to provide learning experience to such infants whereby to take advantage of those theories if they are correct and, notwithstanding their correctness, to provide an apparatus which will provide a readily discernible effect which an infant can associate with movement of his limbs.

Another object of the invention is to provide an apparatus which will enable an infant to learn that there is a world beyond himself that he can effect by his movements. Another object is to provide a toy by which an infant can entertain himself while unattended. In this connection, it is an object of the invention to provide an apparatus which can be employed with a wide variety of crib constructions and which presents no danger of harm to the infant.

Other objects are to provide an educational toy which is inexpensive to manufacture and easily installed in a child's crib which is sufficiently rugged to withstand all the abuse to which it can reasonably expect to be subjected.

These and other objects and advantages of the invention which will hereinafter appear are realized in part by the provision of a toy for attachment to an infant's crib which comprises an elongate, pliable member having dimensions to extend substantially across an infant's crib in a position for engagement by a limb of an infant occupying the crib and including an extensible resilient section along its length; by the provision of means for securing that member across the crib in that position with its resilient section extended; and by the provision of signal means responsive to movement of the pliable member for providing a signal additional to its movement.

In the drawings:

Both of the embodiments shown in the drawing shown in connection with a child's crib of a type which is currently most popular. The embodiments shown are arranged for use with a crib of this kind and in one of the embodiments the crib forms part of the device. However, the invention in its broadest sense is applicable to cribs of other kinds and it will be apparent that it can be adapted to an infant beds and infant containing structures of a wide variety of shapes and kinds, all of which are described by the general term "crib."

Figure 2:
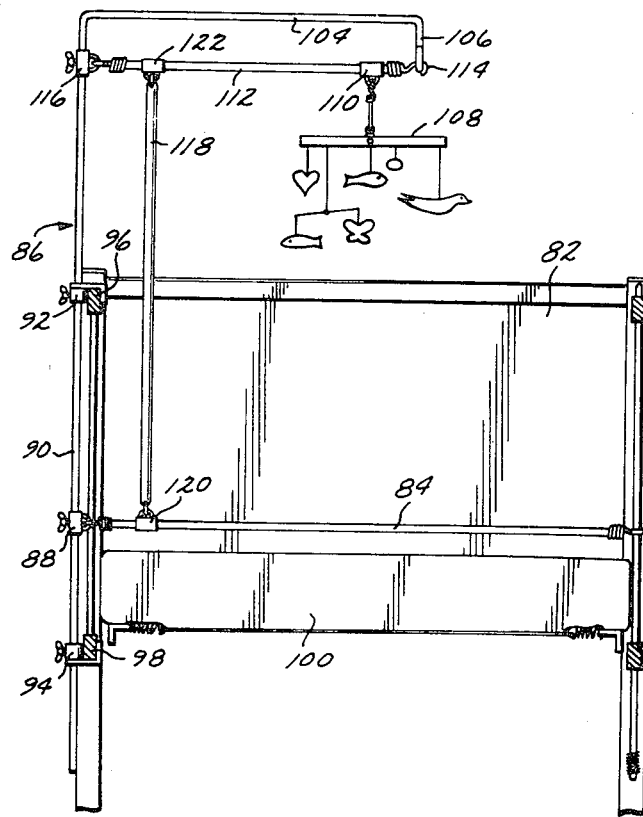

The cribs shown in FIGS. 1 and 2 are of the same kind. They include a headboard and a footboard, a spring frame and spring extending between them, and a pair of side structures. The side structures, together with the headboard and footboard, form a container for an infant disposed on the spring frame and spring structure. In FIG. 1 the crib is generally designated by the reference numeral 10. It comprises a headboard 12 extending between a pair of parallel uprights 14 and 16 above the level of the spring frame 18 which extends from the headboard 12 to the footboard 20. The latter extends between a pair of uprights 22 and 24. The four uprights 14, 16, 22 and 24 form four vertical corner posts for the crib. The frame 18 extends between them horizontally and at a level in the midregion between their upper and lower ends. The headboard 12 and footboard 20 extend upwardly from the frame 18 to form the end walls of the crib. The two sidewalls, generally designated 26 and 28, comprise upper and lower rails arranged in parallel one vertically above the other and interconnected by spaced bars. Only the upper rail 30 of sidewall 26 is visible in FIG. 1. The upper rail of wall 28 is designated by the reference numeral 32 and the lower rail is designated by the reference numeral 34. In this embodiment all of the vertical bars are the same. The bar of sidewall 26 closest to the headboard is designated by the reference numeral 36 for identification and the bar third from the footboard is designated 38. In the case of sidewall 28, the bar third from the footboard is designated by the reference numeral 40. Sidewall 26 is fixed in place but mechanism is incorporated in the crib for raising and lowering the sidewall 28. Guide bars 42 and 44 are part of that mechanism. While the structure for raising and lowering the sidewall forms no part of the invention, it will be apparent that use of the invention does not interfere with this function in the crib and its ability to accommodate movement of the crib wall is one of the features of the invention.

The invention includes an elongate pliable member the length of which is such that it can extend across the crib at a position for engagement by a limb of the infant occupying the crib. That pliable member includes a resilient section by which it may be stretched across the crib and held taut. The embodiment of FIG. 1 includes such a member in its cord 46. In the case of this embodiment, the cord is formed of a length of rubber line. Fastening means are provided by which the line may be secured taut across the crib. In this instance that means comprises a hook 48 which is fastened by an element 50 to one end of the rubber cord 46, and a hook 52 which is connected by a similar fastening means 54 to the opposite end of the cord 46. The hooks 48 and 52 engage the bars 40 and 38 of the side members 28 and 26, respectively. The length of rubber line 46 is such that the line must be stretched to permit the hooks to be engaged in the sidewall bars as shown. The hooks are positioned so that the line extends within reach of the infants' limbs.

The cord is arranged so that it can be readily placed on any of the bars of the crib and at any elevation above the mattress 56 which rests on the spring frame 18 and upon which the infant is placed. When the elongate pliable member is engaged by an arm or a leg of the infant it will yield because of its resilient section and, by its renitance, tend to oppose deformation. Means are provided in the invention for providing a signal in addition to the tactile signal afforded both by engagement with the elongate member, here the cord 46, and by its bias against deformation. Advantageously the signal is an audible or a visible one or both. Both are provided in this invention. In this embodiment the visible signal is provided by a disc toy 58 which comprises a series of discs mounted upon a handle formed of several parts. The disc moves when the handle parts are moved relative to one another. Here the two handle portions are designated by the reference numerals 60 and 62. Portion 60 secured by a convenient means to a support member which, in this case, is another elongate resilient member or cord 56, the ends of which are secured to the upper rails of the sidewalls by hooks 68 and 70. The other portion of the handle 62 is connected by any convenient means to the cord 46. In this case the attachment means are formed by small ferrules through which cords 46 and 56 extend and by which the handles of the whole disc device may be moved along the cord at any selected position. This embodiment also includes means for providing an audible signal. That means comprises a bell 72 which is suspended so that it is moved when the elongate member 46 is moved. It is secured to the cord 66 by a ferrule 74 which can be moved to any selected position along the cord.

Figure 3:
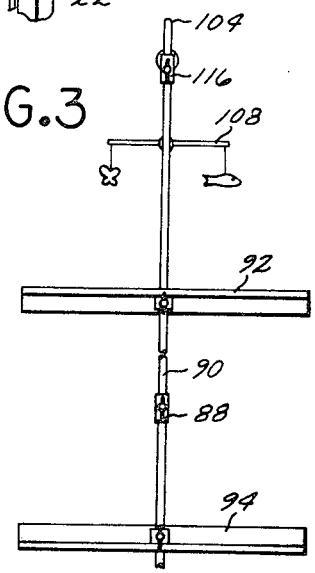

This embodiment includes a second elongate member which is positioned so that it can be engaged by one of the child's limbs and which when engaged will also provide a signal in addition to the tactile signal afforded by mere touching of it. In this instance that second member comprises a cord 76 which extends from a connection by a ferrule 78 to the cord 46 outboard of the ferrule by which the handle section 62 is connected to the cord. At its other end the cord 76 is connected by a hook 80 to another of the bars of the crib. It is required only that engagement with the cord 76 by a limb of the infant result in the provision of a signal and it will be sufficient if the member 76 is effective, upon being moved, to move the cord 46. Advantageously, the member 76 is itself resilient and stretched taut so that by its renitance it will provide a feeling of resistance to deformation. Because of its connection to the cord 46, its movement will be transmitted to the signalling devices. Thus there will be some reaction at the disc toy 58 and there will also be some reaction at the bell 72. However, the reaction at the disc toy will be different when only cord 76 is stuck than it will be when the cord 46 is struck. A vertical deformation of the cord 46 results in relative movement between the two handle sections 60 and 62 of the disc toy which will propel the discs in a given fashion. Vertical displacement of the cord 76 results primarily in horizontal displacement of the cord 46 so that there is little or no relative motion between the two handle portions 60 and 62 and the disc toy may do no more than vibrate. These several cords and the signalling devices, when combined with the crib, provide an easily assembled toy which provides a variety of reactions to the simple arm and leg movements of an infant which are safe and at the same time indicative of a particular kind of movement. If indeed there is educational value to an infant in being able to observe reactions to his arm and leg movements, then that benefit is achieved. In any event, the toy has proven to be entertaining to infants and it has the advantage of being entertaining to the child's parents as well Another embodiment is illustrated in FIGS. 2 and 3. Like the embodiment of FIG. 1, the structure of FIGS. 2 and 3 is shown in a form which is especially useful in connection with a crib. In this embodiment one end of the elongate pliable member is fastened to a frame which is provided with means by which it may be attached to the side of a crib, advantageously to one of the barred sides. The frame includes a portion which extends above the sides of the bed and terminates there in an arm which extends over the bed. A signalling device is carried on the arm and means are incorporated for activating that signalling device as an incident to displacement or deformation of the elongate pliable member by an infant lying in the crib. FIG. 2 shows the crib in section looking toward the footboard 82. The elongate member 84 in this embodiment is resilient over its entire length and comprises a rubber line. One end of that line is secured to the frame, generally designated by the reference numeral 86, by a collar 88. The frame includes a rod 90 which is held vertically by a pair of transverse attachment structures, both of which comprise a metal "angle iron" having a collar fixed to one of its sides midway along its length. The upper angle 92 and the lower angle 94 both have one horizontal and one vertical side. The vertical sides extend toward one another so that the upper angle will fit over the upper side rail 96 and so that the lower side angle 94 will fit under the lower side rail 98. These brackets are clamped in place by setscrews in their respectively associated collars. A similar setscrew in the collar 88 permits securing its end of the cord 84 at any desired height above the mattress 100 of the crib. The cord is held taut across the crib by a hook 102 by which the other end of the cord is secured to one of the bars of the opposite side of the crib.

At its upper end the rod 90 is bent inwardly over the bed to form an arm 104 the very end 106 of which is turned downwardly toward the bed. A signalling device is carried on that arm. Advantageously the signalling device is a mobile. The mobile is preferred because a substantial amount of motion results from a minimum of input force and that motion continues over a period longer than the time of application of the initiating force. In this embodiment the mobile 108 is attached to a ferrule 110 which is slidably disposed upon an elastic cord 112. Cord 112 is stretched between a hook 114 at one end by which it is attached to the downwardly extending end portion 106 of the arm 104 and a collar 116 which is slidable along the upright portion of the rod 90 and can be fixed in position by a setscrew which it carries. The two cords 84 and 112 are interconnected by an elongate member 118 which advantageously is pliable but relatively nonresilient. Its ends are connected to ferrules slidably disposed upon the two cords. Ferrule 120 on cord 84 is connected to the lower end of the cord 118 and the ferrule 122 on cord 112 is connected to the upper end of the cord or connecting line 118. If the line 118 is solid or is resilient and stretched then either upward or downward movement of the line 84 will be transmitted to the line 112 and to the mobile 108. In this embodiment, the interconnecting line 118 being pliant but not resilient, only downward motions of the cord 84 will be transmitted to the cord 112. Thereby only a specialized motion of the infants' limb against the cord 84 will result in actuation of the mobile.

It will be apparent that other forms of the device may be produced by omitting various elements of the embodiments selected for illustration or by combining elements of the two embodiments as well as by adding additional cords and signalling devices. Nonetheless, the embodiments selected for illustration in the drawing are considered to be especially advantageous forms of the invention.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An educational toy for attachment to an infant's crib comprising in combination:

an elongate, pliable member having dimension to extend substantially across an infant's crib in a position for engagement by a limb of an infant occupying the crib and including an extensible resilient section along its length;

means for securing said member across the crib in said position with its resilient section extended;

signal means responsive to movement of said member for providing a signal additional to the movement of the member; and a second pliable member connected to the first at a point along its length and itself having length to extend at least part way across the crib in a direction and at a level for engagement by another limb of an infant occupying said crib, and means for securing said second pliable member in taut condition to one side of the crib.

2. An educational toy for attachment to an infant's crib comprising in combination:

an elongate, pliable member having dimension to extend substantially across an infant's crib in a position for engagement by a limb of an infant occupying the crib and including an extensible resilient section along its length;

means for securing said member across the crib in said position with its resilient section extended;

signal means responsive to movement of said member for providing a signal additional to the movement of the member;

a frame including a post, means to secure the post to the crib so that one end extends above it, and an arm extending laterally from the upper end of the post;

in which said signal means comprises a visible signalling device carried by said arm and is responsive to motion to provide a signal; and means for transmitting motion from said pliable member to said visible signalling device.

3. The invention defined in claim 2, in which said signalling device is a mobile.

4. The invention defined in claim 2, in which one end of said pliable member is fixed to said post.

5. The invention defined in claim 4, which further comprises a second pliable member having fixed connection to the first mentioned pliable member at a point along its length and itself having length to extend at least part way across the crib in a direction and at a level to be engageable by another limb of an infant occupying the crib and means for holding said second pliable member taut in said position.

6. The invention defined in claim 5, in which said visible signal device has the form of a mobile carried by the arm of said frame and in which said signal means further comprises a bell.

7. In combination with an infant's crib of the type comprising a padded bottom wall surrounded by upstanding walls including two vertically barred, parallel sidewalls each extending from the head to the foot end of the crib;
   an elongate, elastomeric member less long, when relaxed, than the distance between said barred sidewalls and having resilience permitting it to be stretched from one sidewall to the other;
   means at each end of said elastomeric member engaged with a bar of a respectively associated barred wall such that the elastomeric member is so stretched at a level above said bottom wall at which it can be engaged by the foot of an infant occupying the crib;
   a second elongate, elastomeric member secured at one end to said first-mentioned member at a point along the length of the latter and including means at the other end of said second member securing it to the bar of one of said barred sides such that the second member is stretched taut in a position, and at a level, for engagement by an arm of an infant occupying the crib;
   and means responsive to movement of at least one of said elastomeric members to provide a signal in addition to its movement.

8. The invention defined in claim 7, which further comprises a bracket, the bracket including a bar attached to and extending above one side of the crib and an arm attached to the bar and extending over the crib; said means to provide a signal comprising a signalling device carried on said arm; said invention further comprising means for interconnecting said signalling means with said elastomeric members.

* * * * *